No. 834,051. PATENTED OCT. 23, 1906.
L. P. FRIESTEDT.
SHEET PILING.
APPLICATION FILED NOV. 23, 1904.
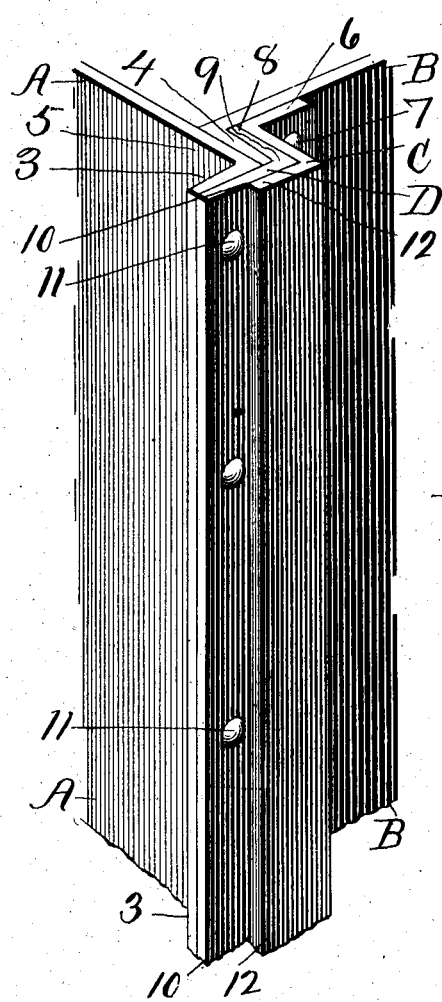
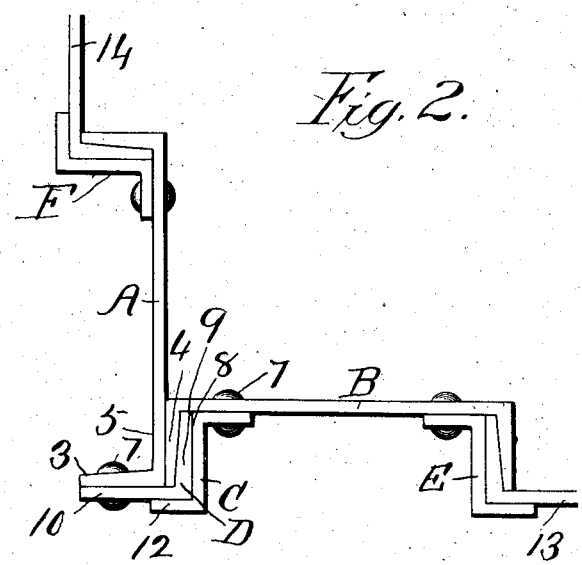
Witnesses:
Chas. L. Gaylord.
John Enders.
Inventor:
Luther P. Friestedt,
By L. B. Coupland.
Atty.

UNITED STATES PATENT OFFICE.

LUTHER P. FRIESTEDT, OF CHICAGO, ILLINOIS.

SHEET-PILING.

No. 834,051.     Specification of Letters Patent.     Patented Oct. 23, 1906.

Application filed November 23, 1904. Serial No. 234,077.

*To all whom it may concern:*

Be it known that I, LUTHER P. FRIESTEDT, a citizen of the United States, residing at Chicago, in the county of Cook and State of Illinois, have invented new and useful Improvements in Sheet-Piling, of which the following is a specification.

This invention relates to improvements in sheet-piling, and more especially to features in corner construction, and has for its object to provide a corner-section that is easily rolled and lighter in weight than that ordinarily used and at the same time afford all the strength necessary in structures of this character.

In the drawings, Figure 1 is a view in perspective of a corner-section embodying the improved features, and Fig. 2 is a plan.

The corner construction in this instance comprises the loosely-joining edges of the companion channel-beams A and B, a Z-beam C, and an interlocking angle-beam D.

The joining corner-sections A and B are positioned at right angles with reference to each other, but do not have a direct interlocking engagement. The beam-section A is set with the corner-flange 3 facing outward. The beam-section B is also set with the corner-flange 4 facing outward and which when assembled in a corner structure abuts against web 5 of beam A and rests in a plane at right angles to flange 3, as best shown in Fig. 2.

The flange 6 of the Z-beam C, forming a part of the corner-section, is rigidly secured to beam-section B by a number of rivets 7. A space 8 is provided between the Z-beam C and the corner-flange 4 of beam-section B for the loose insertion of the free wing 9 of angle-beam D in forming a separable interlocking engagement. The other wing 10 of angle D is fastened to corner-flange 3 of beam-section A by a number of rivets 11. The free flange 12 of Z-beam C overlaps the outside corner of the angle D in preventing any displacement thereof in the operation of driving. By this arrangement special beams are not required when a corner is to be turned, the principal companion beams entering into the lineal wall structure being used, the beam A being provided with the angle-beam D, rigidly secured to the corner edge thereof, the joining beam-section B being provided with two Z-beams, the beam C for the corner structure, and beam E in providing an interlock for the next joining section 13 in construction of the lineal wall structure. The beam-section A is provided with but one Z-beam F for engagement with the next joining beam-section 14 in continuing the wall in that direction.

Having thus described my invention, what I claim is—

1. In sheet-piling, companion beam-sections positioned at right angles with reference to each other but not interlocking and means for rigidly holding said beams in such position.

2. In sheet-piling, a beam-section and an angle-beam having one wing free and the other rigidly secured to the joining edge of said beam-section, said free wing providing a space for the engagement of a joining-section when set at right angles with reference to said beam-section.

3. In sheet-piling, companion beam-sections positioned at right angles with reference to each other, a Z-beam rigidly secured to one of said beam-sections, and an angle-beam interposed between said beam-sections and Z-beam.

4. In sheet-piling, companion beam-sections positioned at right angles with reference to each other but not interlocking, an angle-beam overlapping the respective joining edges of said beam-sections and rigidly secured to one of said sections, and a Z-beam overlapping the angle-beam and rigidly secured to the other beam-section.

In testimony whereof I have signed my name to this specification in the presence of two subscribing witnesses.

LUTHER P. FRIESTEDT.

Witnesses:
L. B. COUPLAND.
J. B. DONALSON.